United States Patent
Stav et al.

(10) Patent No.: US 12,098,103 B2
(45) Date of Patent: Sep. 24, 2024

(54) GYPSUM BOARD CONTAINING A POLYOL COMPOUND

(71) Applicant: Gold Bond Building Products, LLC, Charlotte, NC (US)

(72) Inventors: Eli Stav, Charlotte, NC (US); Gene Whittington, Fort Mill, SC (US); Bradley J. Busche, Shelby, NC (US); R. G. Iyer, Charlotte, NC (US); Elizabeth Burgess, Matthews, NC (US); Joseph J. Bailey, Charlotte, NC (US)

(73) Assignee: Gold Bond Building Products, LLC, Charlotte, NC (US)

( * ) Notice: Subject to any disclaimer, the term of this patent is extended or adjusted under 35 U.S.C. 154(b) by 156 days.

(21) Appl. No.: 17/680,467

(22) Filed: Feb. 25, 2022

(65) Prior Publication Data
US 2022/0274879 A1    Sep. 1, 2022

Related U.S. Application Data

(60) Provisional application No. 63/154,140, filed on Feb. 26, 2021.

(51) Int. Cl.
| | | |
|---|---|---|
| *C04B 28/14* | (2006.01) | |
| *B28B 19/00* | (2006.01) | |
| *B32B 13/08* | (2006.01) | |
| *C04B 24/02* | (2006.01) | |
| *C04B 24/10* | (2006.01) | |
| *C04B 24/32* | (2006.01) | |
| *C04B 24/38* | (2006.01) | |
| *C04B 111/00* | (2006.01) | |

(52) U.S. Cl.
CPC .......... *C04B 28/14* (2013.01); *B28B 19/0092* (2013.01); *B32B 13/08* (2013.01); *C04B 24/02* (2013.01); *C04B 24/10* (2013.01); *C04B 24/32* (2013.01); *C04B 24/38* (2013.01); *C04B 2111/0062* (2013.01); *C04B 2201/20* (2013.01)

(58) Field of Classification Search
None
See application file for complete search history.

(56) References Cited

U.S. PATENT DOCUMENTS

| | | |
|---|---|---|
| 2,078,199 A | 4/1937 | King |
| 2,571,343 A | 10/1951 | Dailey et al. |
| 3,393,116 A | 7/1968 | Larson |
| 4,278,468 A | 7/1981 | Selbe et al. |
| 4,655,950 A | 4/1987 | Michalek |
| 4,681,644 A | 7/1987 | Dozsa |
| 5,534,059 A | 7/1996 | Immordino |
| 8,088,218 B2 | 1/2012 | Blackburn et al. |
| 8,597,426 B2 | 12/2013 | Lee et al. |

(Continued)

*Primary Examiner* — John J Figueroa
(74) *Attorney, Agent, or Firm* — Dority & Manning, P.A.

(57) ABSTRACT

The present invention is directed to a gypsum board and a method of making such gypsum board. For instance, the gypsum board comprises a gypsum core, a first facing material, and a second facing material wherein the first facing material and the second facing material sandwich the gypsum core. The gypsum core comprises a first gypsum core section and a second gypsum core section each comprising gypsum, wherein the first gypsum core section comprises a polyol compound and has a density higher than a density of the second gypsum core section.

24 Claims, 2 Drawing Sheets

(56) References Cited

U.S. PATENT DOCUMENTS

| | | |
|---|---|---|
| 8,617,718 B2 | 12/2013 | Rohlf et al. |
| 8,801,852 B2 | 8/2014 | Lee et al. |
| 9,487,654 B2 | 11/2016 | Petrovic et al. |
| 9,617,412 B2 | 4/2017 | Petrovic et al. |
| 10,119,004 B2 | 11/2018 | Petrovic et al. |
| 11,414,352 B2* | 8/2022 | Pelot .................. C04B 22/16 |
| 2004/0170873 A1* | 9/2004 | Smith .................. G02B 6/2852 |
| | | 428/703 |
| 2011/0054081 A1 | 3/2011 | Dierschke et al. |
| 2012/0167805 A1 | 7/2012 | Wittbold et al. |
| 2013/0005861 A1 | 1/2013 | Dierschke et al. |
| 2016/0222646 A1* | 8/2016 | Thomas .................. E04C 2/28 |
| 2021/0179506 A1* | 6/2021 | Teng .................. C04B 28/14 |
| 2023/0159393 A1* | 5/2023 | Piercy .................. E04B 2/723 |
| | | 428/304.4 |

\* cited by examiner

GYPSUM BOARD CONTAINING A POLYOL COMPOUND

CROSS-REFERENCE TO RELATED APPLICATION

The present application claims filing benefit of U.S. Provisional Patent Application Ser. No. 63/154,140 having a filing date of Feb. 26, 2021, and which is incorporated herein by reference in its entirety.

BACKGROUND OF THE INVENTION

Gypsum board is commonly employed in drywall construction of interior walls and ceilings and also has other applications. Generally, these gypsum boards are formed from a gypsum slurry including a mixture of calcined gypsum, water, and other conventional additives. The mixture is cast and allowed to set by reaction of the calcined gypsum with the water. During the production process, free or unreacted water is removed during a drying or heating process in order to provide a relatively dry product. During this process, the surface and/or edges of the gypsum board may be exposed to relatively high temperatures. As a result, in addition to removing any free or unreacted water, the gypsum crystals (i.e., calcium sulfate dihydrate crystals) may also become partially dehydrated. In this regard, the crystalline water may also become disassociated and be removed thereby resulting in calcination at the surface and/or edges of the gypsum board. Such calcination may affect the board properties as well as the board aesthetics.

As a result, there is a need to provide an improved gypsum board to alleviate such concerns with surface and/or edge calcination.

SUMMARY OF THE INVENTION

In accordance with one embodiment of the present invention, a gypsum board is disclosed. The gypsum board comprises a gypsum core, a first facing material, and a second facing material wherein the first facing material and the second facing material sandwich the gypsum core. The gypsum core comprises a first gypsum core section and a second gypsum core section each comprising gypsum, wherein the first gypsum core section comprises a polyol compound and has a density higher than a density of the second gypsum core section.

In accordance with another embodiment of the present invention, a method of forming a gypsum board is disclosed. The method comprises: providing a first facing material; depositing a first gypsum slurry comprising stucco, a polyol compound, and water onto the first facing material; depositing a second gypsum slurry comprising stucco and water onto the first gypsum slurry; providing a second facing material on the second gypsum slurry; and allowing the stucco to convert to calcium sulfate dihydrate.

In accordance with another embodiment of the present invention, a method of forming a gypsum board is disclosed. The method comprises:

providing a first facing material; depositing onto a first facing material a first gypsum slurry comprising stucco, a polyol compound, and water, a second gypsum slurry comprising stucco and water, and a third gypsum slurry comprising stucco, a polyol compound, and water, wherein the second gypsum slurry is deposited between the first gypsum slurry and the second gypsum slurry; providing a second facing material on the first, second, and third gypsum slurries; and allowing the stucco to convert to calcium sulfate dihydrate.

In accordance with another embodiment of the present invention, a method of forming a gypsum board is disclosed. The method comprises:

providing a first facing material; depositing a first gypsum slurry comprising stucco, a polyol compound, and water onto the first facing material; depositing onto the first gypsum slurry a second gypsum slurry comprising stucco, a polyol compound, and water, a third gypsum slurry comprising stucco and water, and a fourth gypsum slurry comprising stucco, a polyol compound, and water, wherein the third gypsum slurry is deposited between the second gypsum slurry and the third gypsum slurry; providing a second facing material on the second, third, and fourth gypsum slurries; and allowing the stucco to convert to calcium sulfate dihydrate.

BRIEF DESCRIPTION OF THE DRAWINGS

The invention will now be described, by way of example, with reference to the accompanying drawings, in which.

DETAILED DESCRIPTION

Figure 1:
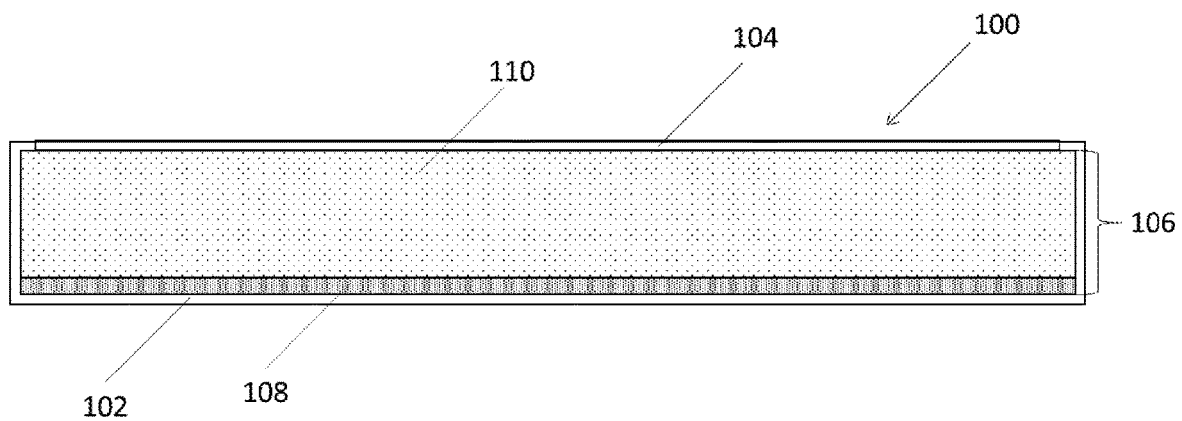
FIGS. 1-5 illustrate cross-sections of various embodiments of gypsum boards according to the present invention.

Reference now will be made in detail to various embodiments. Each example is provided by way of explanation of the embodiments, not as a limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally speaking, the present invention is directed to a gypsum board and a method of making such gypsum board. In particular, the present invention is directed to the use of a polyol compound within the gypsum core of a gypsum board. The present inventors have discovered that various benefits may be realized by providing a polyol compound in such a manner. For instance, the present inventors have discovered that surface and/or edge calcination of the gypsum board may be reduced or minimized during the drying and/or heating process.

In general, the gypsum board includes a gypsum core, a first facing material, and a second facing material wherein the first facing material and the second facing material sandwich the gypsum core. The gypsum core includes a first gypsum core section including the polyol compound and a second gypsum core section. As further explained below, the first gypsum core section may constitute a section of the gypsum core that is denser than the second gypsum core section.

In general, the gypsum core, in particular each gypsum core section, may comprise calcium sulfate dihydrate. In addition, in one embodiment, the first gypsum core section may comprise a polyol compound. In general, the polyol compound may be any polyol compound. For instance, the polyol compound may be a sugar, a sugar alcohol, a polyether, a polysaccharide, or a mixture thereof. In one embodiment, the polyol compound may include glycerol. In another embodiment, the polyol compound may include a sugar. In a further embodiment, the polyol compound may include a sugar alcohol. In an even further embodiment, the polyol compound may include a polyether. In another further embodiment, the polyol compound may include a polysaccharide.

As indicated above, the polyol compound may include a sugar. The sugar may be glucose, sucrose, fructose, lactose, dextrose, or a mixture thereof. In one embodiment, the sugar may be glucose. In another embodiment, the sugar may be sucrose. In a further embodiment, the sugar may be fructose. In an even further embodiment, the sugar may be lactose. In a further embodiment, the sugar may be dextrose.

As indicated above, the polyol compound may include a sugar alcohol. The sugar alcohol may be glycerol, maltitol, sorbitol, mannitol, xylitol, erythritol, isomalt, threitol, arabitol, galactitol, fucitol, iditol, inositol, volemitol, lactitol, or a mixture thereof. In one embodiment, the sugar alcohol may be glycerol. In another embodiment, the sugar alcohol may be sorbitol. In a further embodiment, the sugar alcohol may be mannitol. In an even further embodiment, the sugar alcohol may be erythritol. In another embodiment, the sugar alcohol may be xylitol.

The sugar alcohol may have from 3 carbon atoms to 24 carbon atoms. For instance, the sugar alcohol may have 3 or more carbon atoms, such as 4 or more carbon atoms, such as 5 or more carbon atoms, such as 6 or more carbon atoms, such as 7 or more carbon atoms, such as 8 or more carbon atoms, such as 10 or more carbon atoms, such as 12 or more carbon atoms, such as 16 or more carbon atoms, such as 20 or more carbon atoms. The sugar alcohol may have 24 or less carbon atoms, such as 20 or less carbon atoms, such as 18 or less carbon atoms, such as 14 or less carbon atoms, such as 10 or less carbon atoms, such as 8 or less carbon atoms, such as 6 or less carbon atoms, such as 5 or less carbon atoms, such as 4 or less carbon atoms. For instance, the sugar alcohol may have 3 carbon atoms. In another embodiment, the sugar alcohol may have 4 carbon atoms. In a further embodiment, the sugar alcohol may have 5 carbon atoms. In an even further embodiment, the sugar alcohol may have 6 carbon atoms.

As indicated above, the polyol compound may include a polyether. The polyether may include polyethylene glycol, polypropylene glycol, polyglycerol, a polyglycerol ester, or a mixture thereof. In one embodiment, the polyether may include polyethylene glycol. In another embodiment, the polyether may include polypropylene glycol. In a further embodiment, the polyether may be a polyglycerol. In another embodiment, the polyether may be a polyglycerol ester. For example, the polyglycerol ester may be a fatty acid ester.

As indicated above, the polyol compound may include a polysaccharide. In general, a polysaccharide includes a large number of glucose monosaccharide units joined together by glycosidic bonds. Generally, polysaccharides can be found in plants and seeds. The polysaccharide may be chitin, chitosan, alginate, polydextrose, cyclodextrin, or a mixture thereof. In this regard, in one embodiment, the polysaccharide may be a dextrin. For instance, the dextrin may be a maltodextrin. The polysaccharide may be a starch. For instance, the starch may be a corn starch, a wheat starch, a milo starch, a potato starch, a rice starch, an oat starch, a barley starch, a cassava starch, a tapioca starch, a pea starch, a rye starch, an amaranth starch, or other commercially available starch.

In one embodiment, the polyol compound may be a modified polyol compound. For instance, the modified polyol compound may be an ethoxylated polyol compound, an esterified polyol compound, or a mixture thereof. In one embodiment, the modified polyol compound may be an ethoxylated polyol compound. In another embodiment, the modified polyol compound may be an esterified polyol compound.

Also, it should be understood that the polyol compound may include a combination of polyol compounds, such as any of those mentioned above. For instance, it should be understood that the polyol compound may include more than one different polyol compound. For instance, in one embodiment, at least two different polyol compounds may be utilized. In another embodiment, at least three different polyol compounds may be utilized.

The polyol compound may have a relatively low molecular weight. For instance, the molecular weight may be 5,000 g/mol or less, such as 4,000 g/mol or less, such as 3,000 g/mol or less, such as 2,000 g/mol or less, such as 1,800 g/mol or less, such as 1,600 g/mol or less, such as 1,400 g/mol or less, such as 1,200 g/mol or less, such as 1,000 g/mol or less, such as 800 g/mol or less, such as 600 g/mol or less, such as 500 g/mol or less, such as 400 g/mol or less, such as 300 g/mol or less, such as 200 g/mol or less. The molecular weight may be 25 g/mol or more, such as 50 g/mol or more, such as 75 g/mol or more, such as 100 g/mol or more, such as 125 g/mol or more, such as 150 g/mol or more, such as 200 g/mol or more, such as 250 g/mol or more, such as 300 g/mol or more, such as 400 g/mol or more, such as 500 g/mol or more.

The polyol compound may be present in an amount of 0.001 lbs/MSF or more, such as 0.01 lbs/MSF or more, such as 0.05 lbs/MSF or more, such as 0.1 lbs/MSF or more, such as 0.2 lbs/MSF or more, such as 0.25 lbs/MSF or more, such as 0.5 lbs/MSF or more, such as 0.75 lbs/MSF or more, such as 1 lb/MSF or more, such as 1.5 lbs/MSF or more, such as 2 lbs/MSF or more, such as 2.5 lbs/MSF or more, such as 3 lbs/MSF or more, such as 4 lbs/MSF or more. The polyol compound may be present in an amount of 150 lbs/MSF or less, such as 100 lbs/MSF or less, such as 50 lbs/MSF or less, such as 25 lbs/MSF or less, such as 15 lbs/MSF or less, such as 10 lbs/MSF or less, such as 5 lbs/MSF or less, such as 4 lbs/MSF or less, such as 3 lbs/MSF or less, such as 2.5 lbs/MSF or less, such as 2 lbs/MSF or less, such as 1.5 lbs/MSF or less, such as 1 lbs/MSF or less. Such MSF (which refers to 1,000 square feet) value may be based on the weight of the gypsum board in one embodiment. In another embodiment, such MSF value may be based the weight of the gypsum core. In a further embodiment, such MSF value may be based the weight of the gypsum within the gypsum core. In an even further embodiment, such MSF value may be based on the weight of a respective gypsum core section.

The polyol compound may be present in an amount of 0.001 wt. % or more, such as 0.01 wt. % or more, such as 0.02 wt. % or more, such as 0.05 wt. % or more, such as 0.1 wt. % or more, such as 0.15 wt. % or more, such as 0.2 wt. % or more, such as 0.25 wt. % or more, such as 0.3 wt. % or more, such as 0.5 wt. % or more based on the weight of the gypsum board. The polyol compound may be present in an amount of 10 wt. % or less, such as 7 wt. % or less, such as 5 wt. % or less, such as 4 wt. % or less, such as 3 wt. % or less, such as 2.5 wt. % or less, such as 2 wt. % or less, such as 1.8 wt. % or less, such as 1.5 wt. % or less, such as 1 wt. % or less, such as 0.8 wt. % or less, such as 0.6 wt. % or less, such as 0.5 wt. % or less, such as 0.4 wt. % or less, such as 0.35 wt. % or less, such as 0.2 wt. % or less based on the weight of the gypsum board. Alternatively, the weight percentage may be based on the weight of the gypsum core. In a further embodiment, such weight percentage may be based on the weight of the gypsum within the gypsum core. In an even further embodiment, such weight percentage may be based on the weight of a respective gypsum core section. Also, the aforementioned weight percentages may be based on the solids content of the gypsum slurry.

As indicated herein, at least one gypsum core section, such as the first gypsum core section, includes a polyol compound. However, it should be understood that other gypsum core sections may also include a polyol compound. In one embodiment, however, the foamed gypsum core section corresponding to the second gypsum core section may not include a polyol compound.

As indicated herein, the gypsum core includes a first gypsum core section and a second gypsum core section. Such sections may refer to layers of gypsum wherein one gypsum core section, such as the first gypsum core section, is denser than the second gypsum core section. In this regard, the first gypsum core section may be a dense layer. In another embodiment, such section may refer to a hard edge of the gypsum core as also defined herein. Similarly, such gypsum core section may be denser than the other gypsum core section. FIGS. 1-5 provide a further illustrate various embodiments of the gypsum board of the present invention.

As illustrated in FIG. 1, the gypsum board 100 includes a gypsum core 106, a first facing material 102, and a second facing material 104. The first facing material 102 and the second facing material 104 sandwich the gypsum core 106. The gypsum core includes a first gypsum core section 108 and a second gypsum core section 110. In this regard, the gypsum core sections may be referred to as layers that extend across the major surface area of the facing materials. For instance, the first gypsum core section 108 extends over the major surface area of the first facing material 102. While not intended to be limited, the first facing material may be referred to as the front of the gypsum board. In addition, the first gypsum core section may have a density greater than the second gypsum core section. Accordingly, the first gypsum core section may be formed using a gypsum slurry without the use of a foaming agent or with a reduced amount of foaming agent, which may be utilized in forming the second gypsum core section. In this regard, in one embodiment, the first gypsum core section may have the same composition as the second gypsum core section except that the second gypsum core section may be formed using a foaming agent or a greater amount of foaming agent. Alternatively, or in addition, the second gypsum core section may be formed using other means to adjust the density thereby providing it with a lower density than the first gypsum core section.

Figure 2:
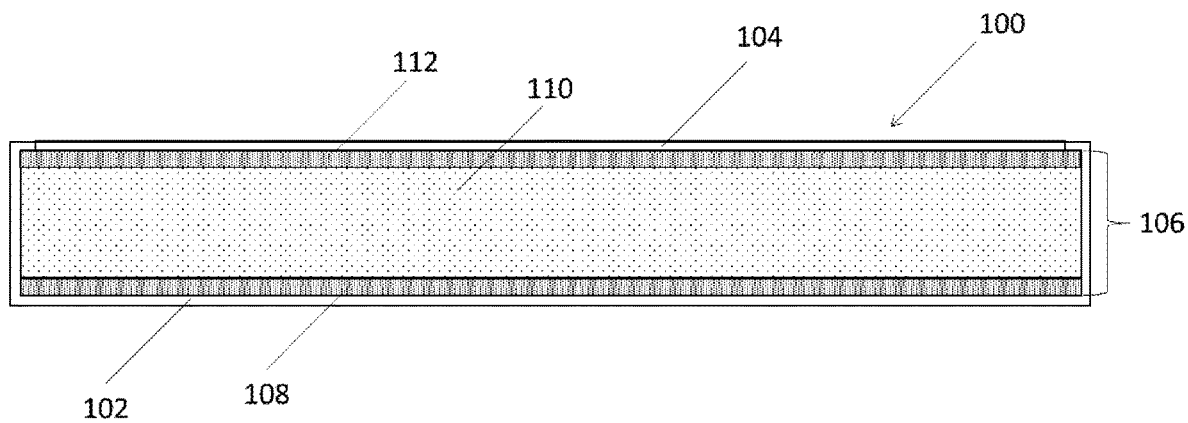

As illustrated in FIG. 2, in one embodiment, the gypsum core may also include a third gypsum core section 112. The third gypsum core section may be provided between the second gypsum core section 110 and the second facing material 104. Like the first gypsum core section, the third gypsum core section may also be a dense gypsum core section. In particular, the third gypsum core section may have a density greater than the second gypsum core section. Accordingly, the third gypsum core section may be formed using a gypsum slurry without the use of a foaming agent or with a reduced amount of foaming agent, which may be utilized in forming the second gypsum core section. In this regard, in one embodiment, the third gypsum core section may have the same composition as the second gypsum core section except that the second gypsum core section may be formed using a foaming agent or a greater amount of foaming agent. Alternatively, or in addition, the second gypsum core section may be formed using other means to adjust the density thereby providing it with a lower density than the third gypsum core section.

Figure 3:
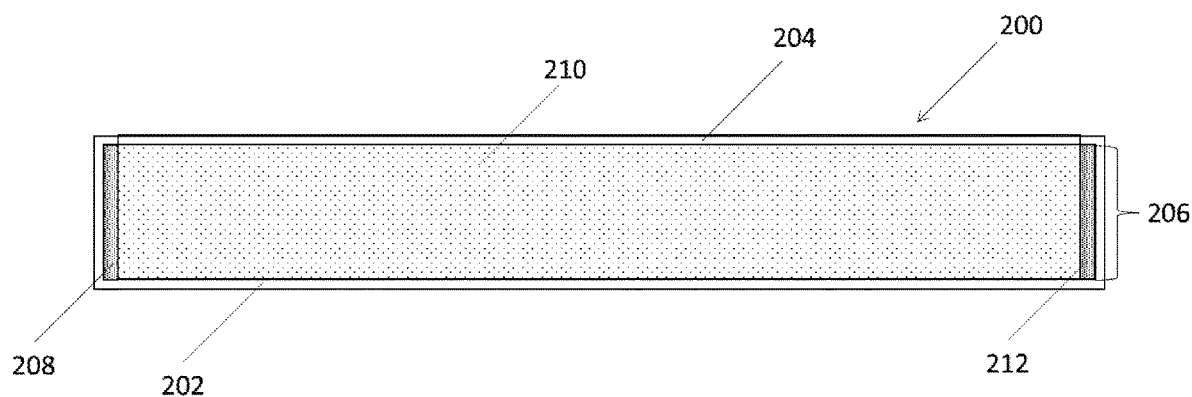

While the aforementioned refer to layers, the gypsum core sections may also refer to edges. For example, FIG. 3 illustrates a gypsum board 200 including a gypsum core 206, a first facing material 202, and a second facing material 204. The first facing material 202 and the second facing material 204 sandwich the gypsum core 206. The gypsum core includes a first gypsum core section 208, a second gypsum core section 210, and a third gypsum core section 212. For instance, the first gypsum core section 208 and the third gypsum core section 310 may sandwich the second gypsum core section 210. In this regard, the gypsum core sections, may only partially cover the surface area of a respective facing material. For instance, each gypsum core section 208, 210, 212 only partially covers a surface area of the first facing material 202 and the second facing material 204. In addition, the first gypsum core section may have a density greater than the second gypsum core section. Accordingly, the first gypsum core section may be formed using a gypsum slurry without the use of a foaming agent or with a reduced amount of foaming agent, which may be utilized in forming the second gypsum core section. In this regard, in one embodiment, the first gypsum core section may have the same composition as the second gypsum core section except that the second gypsum core section may be formed using a foaming agent or a greater amount of foaming agent. In one embodiment, like the first gypsum core section, the third gypsum core section may also be a dense gypsum core section. In particular, the third gypsum core section may have a density greater than the second gypsum core section. Accordingly, the third gypsum core section may be formed using a gypsum slurry without the use of a foaming agent or with a reduced amount of foaming agent, which may be utilized in forming the second gypsum core section. In this regard, in one embodiment, the third gypsum core section may have the same composition as the second gypsum core section except that the second gypsum core section may be formed using a foaming agent or a greater amount of foaming agent.

Figure 4:
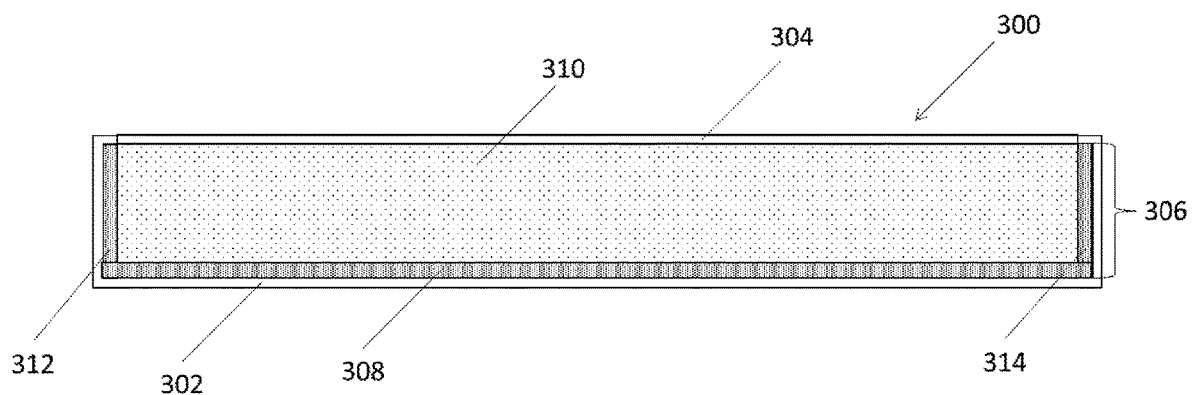
Figure 5:
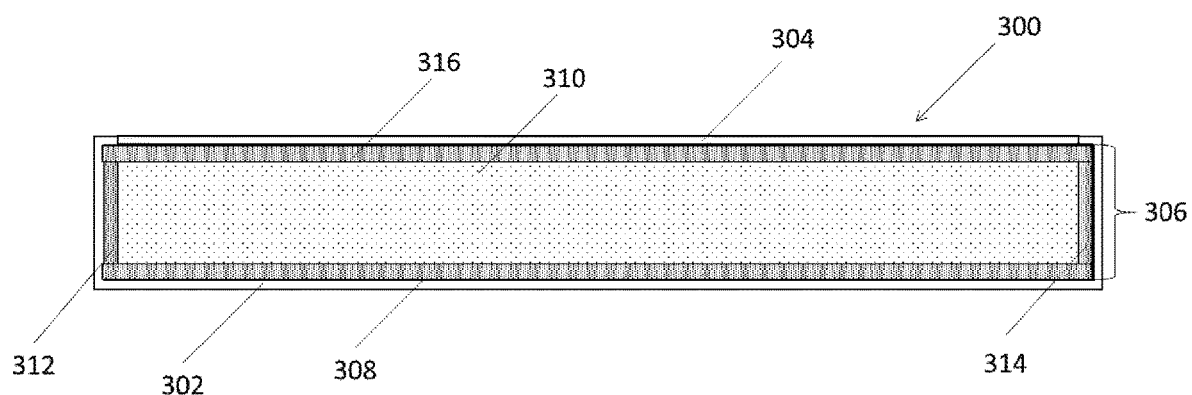

In addition, as illustrated in FIGS. 4 and 5, any combination of the aforementioned gypsum core sections illustrated in FIGS. 1-3 and described above may be utilized. For instance, in FIG. 4, the gypsum board 300 includes a gypsum core 306 including a first gypsum core section 308, a second gypsum core section 310, a third gypsum core section 312, and a fourth gypsum core section 314. Meanwhile, FIG. 5 includes a fifth gypsum core section 316. The first gypsum core section 308, second gypsum core section 310, and the fifth gypsum core section 316 may correspond to the first gypsum core section 108, second gypsum core section 110, and the third gypsum core section 112 as illustrated in FIGS. 1-2 and described above. Meanwhile, the third gypsum core section 312 and the fourth gypsum core section 314 may correspond to the first gypsum core section 208 and the second gypsum core section 212 as illustrated in FIG. 3 and described above.

As indicated herein, the first gypsum core section comprises a polyol compound. In another embodiment, the second gypsum core section may comprise a polyol compound. In an even further embodiment, both the first and second gypsum core sections may comprise a polyol compound. In a further embodiment, such as illustrated in FIGS. 1-3, the third gypsum core section may comprise a polyol compound. In an even further embodiment, the first and third gypsum core sections may comprise a polyol compound. In a further embodiment, all three gypsum core sections may comprise a polyol compound. However, as illustrated in FIGS. 4 and 5, in one embodiment, the fourth gypsum core section may comprise a polyol compound. In addition, or alternatively, the fifth gypsum core section may comprise a polyol compound.

In this regard, the polyol compound may be provided in only one gypsum core section. Alternatively, the polyol compound may be provided in two gypsum core sections. In a further embodiment, the polyol compound may be provided in three gypsum core sections. In an even further embodiment, the polyol compound may be provided in four gypsum core sections.

In this regard, when the gypsum core includes multiple gypsum core sections, the gypsum slurry may be deposited in multiple steps for forming the gypsum core. For instance, each gypsum core section may require a separate deposition of gypsum slurry as indicated below. In this regard, with a first gypsum core section and a second gypsum core section as illustrated in FIGS. 1 and 2, a first gypsum slurry may be deposited followed by a second gypsum slurry. The first gypsum slurry and the second gypsum slurry may have the same composition except that the second gypsum slurry may include a foaming agent or more foaming agent than the first gypsum slurry. In this regard, in one embodiment, the first gypsum slurry may not include a foaming agent. Accordingly, the first gypsum slurry may result in a dense gypsum core section, in particular a non-foamed gypsum core section. Such gypsum core section may have a density greater than the gypsum core section formed from the second gypsum slurry, or foamed gypsum core section.

Similarly, when the gypsum core includes three gypsum core sections, the gypsum slurry may be deposited in three steps for forming the gypsum core. For example, a first and second gypsum slurry may be deposited as indicated above and a third gypsum slurry may be deposited onto the second gypsum slurry. The third gypsum slurry and the second gypsum slurry may have the same composition except that the second gypsum slurry may include a foaming agent or more foaming agent than the third gypsum slurry. In this regard, in one embodiment, the third gypsum slurry may not include a foaming agent.

Accordingly, the third gypsum slurry may result in a dense gypsum core section, in particular a non-foamed gypsum core section. Such gypsum core section may have a density greater than the gypsum core section formed from the second gypsum slurry, or foamed gypsum core section.

As illustrated in FIGS. 1, 2, 4, and 5, the first gypsum core section may have a thickness that is 0.001% or more, such as 0.01% or more, such as 0.1% or more, such as 0.5% or more, such as 1% or more, such as 2% or more, such as 3% or more, such as 4% or more, such as 5% or more, such as 10% or more, such as 15% or more the thickness of the second (or foamed) gypsum core section. The thickness may be 80% or less, such as 60% or less, such as 50% or less, such as 40% or less, such as 30% or less, such as 25% or less, such as 20% or less, such as 15% or less, such as 10% or less, such as 8% or less, such as 5% or less, such as 3% or less, such as 2% or less, such as 1% or less the thickness of the second (or foamed) gypsum core section. In one embodiment, such relationship may also be between the third gypsum core section (or fifth gypsum core section of FIG. 5) and the second gypsum core section. In general, thickness refers to the direction that is orthogonal (and in a different plane) to the machine or conveying direction of the first facing material, gypsum core, and second facing material.

As illustrated in FIG. 3, the first gypsum core section may have a width that is 0.001% or more, such as 0.01% or more, such as 0.1% or more, such as 0.5% or more, such as 1% or more, such as 2% or more, such as 3% or more, such as 4% or more, such as 5% or more, such as 10% or more, such as 15% or more the width of the second (or foamed) gypsum core section. The that is 0.001% or more, such as may be 80% or less, such as 60% or less, such as 50% or less, such as 40% or less, such as 30% or less, such as 25% or less, such as 20% or less, such as 15% or less, such as 10% or less, such as 8% or less, such as 5% or less, such as 3% or less, such as 2% or less, such as 1% or less the that is 0.001% or more, such as of the second (or foamed) gypsum core section. In one embodiment, such relationship may also be between the third gypsum core section and the second gypsum core section. In addition, such relationship may also apply between the third gypsum core section and the second gypsum core section as well as the fourth gypsum core section and the second gypsum core section of FIGS. 4 and 5. In general, width refers to the direction that is transverse (and in the same plane) to the machine or conveying direction of the first facing material, gypsum core, and second facing material.

The density of the second (or foamed) gypsum core section may be 0.1% or more, such as 0.5% or more, such as 1% or more, such as 2% or more, such as 3% or more, such as 4% or more, such as 5% or more, such as 10% or more, such as 15% or more the density of the first (or non-foamed) gypsum core section. The density of the second (or foamed) gypsum core section may be 80% or less, such as 60% or less, such as 50% or less, such as 40% or less, such as 30% or less, such as 25% or less, such as 20% or less, such as 15% or less, such as 10% or less, such as 8% or less, such as 5% or less the density of the first (or non-foamed) gypsum core section. In one embodiment, such relationship may also be between the third gypsum core section (or fifth gypsum core section of FIG. 5) and the second gypsum core section. In addition, such relationship may also apply between the third gypsum core section and the second gypsum core section as well as the fourth gypsum core section and the second gypsum core section of FIGS. 4 and 5. Also, in one embodiment, all the gypsum core sections may have a different density.

Furthermore, the voids volume of the second gypsum core section may be greater than the first gypsum core section. For instance, the voids volume, determined by the presence of air and water voids, may be greater in the second gypsum core section than the first gypsum core section. The voids volume of the first gypsum core section may be 0.01% or more, such as 0.1% or more, such as 0.5% or more, such as 1% or more, such as 2% or more, such as 3% or more, such as 4% or more, such as 5% or more, such as 10% or more, such as 15% or more the voids volume of the second gypsum core section. The voids volume of the first gypsum core section may be 80% or less, such as 60% or less, such as 50% or less, such as 40% or less, such as 30% or less, such as 25% or less, such as 20% or less, such as 15% or less, such as 10% or less, such as 8% or less, such as 5% or less the voids volume of the second gypsum core section. In one embodiment, such relationship may also be between the third gypsum core section (or fifth gypsum core section of FIG. 5) and the second gypsum core section. In addition, such relationship may also apply between the third gypsum core section and the second gypsum core section as well as the fourth gypsum core section and the second gypsum core section of FIGS. 4 and 5. Also, in one embodiment, all the gypsum core sections may have a different density.

In addition, in one embodiment, all the gypsum core sections may have a different voids volume. In one embodiment, while the aforementioned refers to a voids volume, it should be understood that such percentages may apply only to the water voids volume. In a further embodiment, it should be understood that such percentages may apply only to the air voids volume. Furthermore, such voids volume may be determined by analyzing a cross section of the gypsum board and determining an approximate volume based on the area of the voids.

In general, the composition of the gypsum core, in particular each gypsum core section, is not necessarily limited and may include any additives as known in the art. For instance, the additives may include dispersants, foam or foaming agents including aqueous foam (e.g. sulfates), set accelerators (e.g., ball mill accelerator—BMA, land plaster, sulfate salts, etc.), set retarders, binders, biocides (such as bactericides and/or fungicides), adhesives, pH adjusters, thickeners (e.g., silica fume, Portland cement, fly ash, clay, celluloses, high molecular weight polymers, etc.), leveling agents, non-leveling agents, colorants, fire retardants or additives (e.g., silica, silicates, expandable materials such as vermiculite, perlite, etc.), water repellants, fillers (e.g., glass fibers), waxes, acids (e.g., boric acid), secondary phosphates (e.g., condensed phosphates or orthophosphates including trimetaphosphates, polyphosphates, and/or cyclophosphates, etc.), mixtures thereof, natural and synthetic polymers, starches, etc. In general, it should be understood that the types and amounts of such additives are not necessarily limited by the present invention.

In general, each additive may be present in the gypsum core in an amount of 0.0001 wt. % or more, such as 0.001 wt. % or more, such as 0.01 wt. % or more, such as 0.02 wt. % or more, such as 0.05 wt. % or more, such as 0.1 wt. % or more, such as 0.15 wt. % or more, such as 0.2 wt. % or more, such as 0.25 wt. % or more, such as 0.3 wt. % or more, such as 0.5 wt. % or more, such as 1 wt. % or more, such as 2 wt. % or more. The additive may be present in an amount of 20 wt. % or less, such as 15 wt. % or less, 10 wt. % or less, such as 7 wt. % or less, such as 5 wt. % or less, such as 4 wt. % or less, such as 3 wt. % or less, such as 2.5 wt. % or less, such as 2 wt. % or less, such as 1.8 wt. % or less, such as 1.5 wt. % or less, such as 1 wt. % or less, such as 0.8 wt. % or less, such as 0.6 wt. % or less, such as 0.5 wt. % or less, such as 0.4 wt. % or less, such as 0.35 wt. % or less, such as 0.2 wt. % or less. The aforementioned weight percentages may also apply based on the weight of the gypsum in the gypsum board. In one embodiment, the aforementioned weight percentages may also apply based on the weight of the gypsum board. Alternatively, the weight percentage may be based on the weight of the gypsum core. In a further embodiment, such weight percentage may be based on the weight of a respective gypsum core section within the gypsum core. Also, the aforementioned weight percentages may also apply based on the solids content of the gypsum slurry.

As indicated herein, the gypsum core is sandwiched by facing materials. The facing material may be any facing material as generally employed in the art. For instance, the facing material may be a paper facing material, a fibrous (e.g., glass fiber) mat facing material, a metallic facing material, or a polymeric facing material. In general, the first facing material and the second facing material may be the same type of material. Alternatively, the first facing material may be one type of material while the second facing material may be a different type of material.

In one embodiment, the facing material may include a paper facing material. For instance, both the first and second facing materials may be a paper facing material. Alternatively, in another embodiment, the facing material may be a glass mat facing material. For instance, both the first and second facing materials may be a glass mat facing material. In a further embodiment, the facing material may be a polymeric facing material. For instance, both the first and second facing materials may be a polymeric facing material. In another further embodiment, the facing material may be a metal facing material (e.g., an aluminum facing material). For instance, both the first and second facing materials may be a metal facing material (e.g., an aluminum facing material).

In addition, as indicated herein, the present invention is also directed to a method of making a gypsum board. The method may include providing a first facing material wherein the first facing material has a first facing material surface and a second facing material surface opposite the first facing material surface. The first facing material may be conveyed on a conveyor system (i.e., a continuous system for continuous manufacture of gypsum board). Then, the method may include a step of depositing a first gypsum slurry including a polyol compound onto the first facing material. Next, a second gypsum slurry may be deposited onto the first gypsum slurry. Then, a second facing material may be provided onto the second gypsum slurry. In this regard, the first and second gypsum slurries are sandwiched between the facing materials in order to form the gypsum board. Such deposition of gypsum slurries may provide a gypsum board having layers as illustrated in FIGS. 1 and 2 as well as any layers in FIGS. 4 and 5.

Alternatively, in one embodiment, the method may include providing a first facing material wherein the first facing material has a first facing material surface and a second facing material surface opposite the first facing material surface. The first facing material may be conveyed on a conveyor system (i.e., a continuous system for continuous manufacture of gypsum board). Then, the method may include a step of depositing a first gypsum slurry including a polyol compound onto the first facing material, depositing a second gypsum slurry onto the first facing material, and depositing a third gypsum slurry onto the first facing material wherein the second gypsum slurry is deposited between the first and second gypsum slurries. In one embodiment, the third gypsum slurry may also include a polyol compound. In this regard, all three of the gypsum slurries may contact the first facing material. Next, a second facing material may be provided onto the gypsum slurries. In this regard, the gypsum slurries are sandwiched between the facing materials in order to form the gypsum board. Such deposition of gypsum slurries may provide a gypsum board having hard edges as indicated above and as illustrated in FIGS. 3-5.

Furthermore, such embodiments may be combined. For instance, the method may include providing a first facing material wherein the first facing material has a first facing material surface and a second facing material surface opposite the first facing material surface. The first facing material may be conveyed on a conveyor system (i.e., a continuous system for continuous manufacture of gypsum board). Then, the method may include a step of depositing a first gypsum slurry including a polyol compound onto the first facing material. Next, a second gypsum slurry, a third gypsum slurry, and a fourth gypsum slurry may be deposited onto the first gypsum slurry wherein the third gypsum slurry is deposited between the second and fourth gypsum slurries.

The second and/or fourth gypsum slurries may include a polyol compound. Then, if desired, a fifth gypsum slurry, also optionally include a polyol compound, may be deposited onto the second, third, and fourth gypsum slurry. If deposition of a fifth gypsum slurry is not desired, the method may simply require providing a second facing material onto the gypsum slurries. Alternatively, if a fifth gypsum slurry is desired, the method may simply require providing a second facing material onto the fifth gypsum slurry. Such deposition of gypsum slurries may provide a gypsum board having layers and/or hard edges as illustrated in FIGS. 4 and 5.

In general, the gypsum slurry includes at least stucco and water. In this regard, the method may also include a step of combining stucco, water, and any optional additives as mentioned herein. However, as indicated herein, at least one gypsum slurry includes a polyol compound as defined herein. In this regard, the method may include a step of also combining the polyol compound with the stucco, water, and any optional additives as indicated herein.

In general, stucco may be referred to as calcined gypsum or calcium sulfate hem ihydrate. The calcined gypsum may be from a natural source or a synthetic source and is thus not necessarily limited by the present invention. In addition to the stucco, the gypsum slurry may also contain some calcium sulfate dihydrate or calcium sulfate anhydrite. If calcium sulfate dihydrate is present, the hem ihydrate is present in an amount of at least 50 wt. %, such as at least 60 wt. %, such as at least 70 wt. %, such as at least 80 wt. %, such as at least 85 wt. %, such as at least 90 wt. %, such as at least 95 wt. %, such as at least 98 wt. %, such as at least 99 wt. % based on the weight of the calcium sulfate hem ihydrate and the calcium sulfate dihydrate. Furthermore, the calcined gypsum may be α-hem ihydrate, β-hemihydrate, or a mixture thereof.

In addition to the stucco, the gypsum slurry may also contain other hydraulic materials. These hydraulic materials may include calcium sulfate anhydrite, land plaster, cement, fly ash, or any combinations thereof. When present, they may be utilized in an amount of 30 wt. % or less, such as 25 wt. % or less, such as 20 wt. % or less, such as 15 wt. % or less, such as 10 wt. % or less, such as 8 wt. % or less, such as 5 wt. % or less based on the total content of the hydraulic material.

The polyol compound may be present in the gypsum slurry in an amount of 0.001 wt. % or more, such as 0.01 wt. % or more, such as 0.02 wt. % or more, such as 0.05 wt. % or more, such as 0.1 wt. % or more, such as 0.15 wt. % or more, such as 0.2 wt. % or more, such as 0.25 wt. % or more, such as 0.3 wt. % or more, such as 0.5 wt. % or more based on the weight of the stucco. The polyol compound may be present in an amount of 10 wt. % or less, such as 7 wt. % or less, such as 5 wt. % or less, such as 4 wt. % or less, such as 3 wt. % or less, such as 2.5 wt. % or less, such as 2 wt. % or less, such as 1.8 wt. % or less, such as 1.5 wt. % or less, such as 1 wt. % or less, such as 0.8 wt. % or less, such as 0.6 wt. % or less, such as 0.5 wt. % or less, such as 0.4 wt. % or less, such as 0.35 wt. % or less, such as 0.2 wt. % or less based on the weight of the stucco. In another embodiment, such weight percentage may be based on the weight of the gypsum slurry. In a further embodiment, such weight percentage may be based on the solids content of the gypsum slurry.

As indicated above, the gypsum slurry may also include water. Water may be employed for fluidity and also for rehydration of the gypsum to allow for setting. The amount of water utilized is not necessarily limited by the present invention.

The weight ratio of the water to the stucco may be 0.1 or more, such as 0.2 or more, such as 0.2 or more, such as 0.3 or more, such as 0.4 or more, such as 0.5 or more. The water to stucco weight ratio may be 4 or less, such as 3.5 or less, such as 3 or less, such as 2.5 or less, such as 2 or less, such as 1.7 or less, such as 1.5 or less, such as 1.4 or less, such as 1.3 or less, such as 1.2 or less, such as 1.1 or less, such as 1 or less, such as 0.9 or less, such as 0.85 or less, such as 0.8 or less, such as 0.75 or less, such as 0.7 or less, such as 0.6 or less, such as 0.5 or less, such as 0.4 or less, such as 0.35 or less, such as 0.3 or less, such as 0.25 or less, such as 0.2 or less.

The manner in which the components are combined for forming the gypsum slurry is not necessarily limited. For instance, the gypsum slurry can be made using any method or device generally known in the art. In particular, the components of the slurry can be mixed or combined using any method or device generally known in the art. For instance, the components of the gypsum slurry may be combined in any type of device, such as a mixer and in particular a pin mixer. In this regard, the manner in which the polyol compound is incorporated into the gypsum slurry is not necessarily limited by the present invention. For instance, the polyol compound may be provided prior to a mixing device, directly into a mixing device, and/or after the mixing device. Further, when provided after the mixing device, the polyol compound may be provided to a canister or boot or by using a secondary mixer. In addition, the polyol compound may be provided alone, as part of a mixture, or in a solution. For instance, it may be provided or added to a mixing device or another compound either alone or as part of a mixture. For instance, the polyol compound may be combined directly with another component of the gypsum slurry. In addition, the polyol compound may be delivered as a solid, as a dispersion/solution, or a combination thereof.

Upon deposition of the gypsum slurries, the calcium sulfate hem ihydrate reacts with the water to hydrate the calcium sulfate hem ihydrate into a matrix of calcium sulfate dihydrate. Such reaction may allow for the gypsum to set and become firm thereby allowing for the boards to be cut at the desired length. In this regard, the method may comprise a step of reacting calcium sulfate hemihydrate with water to form calcium sulfate dihydrate or allowing the calcium sulfate hemihydrate to hydrate to calcium sulfate dihydrate. In this regard, the method may allow for the slurry to set to form a gypsum board. In addition, during this process, the method may allow for dewatering of the gypsum slurry, in particular dewatering any free water instead of combined water of the gypsum slurry. Such dewatering may occur prior to the removal of any free moisture or water in a heating device after a cutting step. Thereafter, the method may also comprise a step of cutting a continuous gypsum sheet into a gypsum board. Then, after the cutting step, the method may comprise a step of supplying the gypsum board to a heating or drying device. For instance, such a heating or drying device may be a kiln and may allow for removal of any free water. The temperature and time required for drying in such heating device are not necessarily limited by the present invention.

By incorporating the polyol compound as indicated herein, the gypsum board may have a relatively higher gypsum content after drying. For instance, the gypsum content may be 50% or more, such as 60% or more, such as 65% or more, such as 70% or more, such as 75% or more, such as 80% or more, such as 85% or more, such as 90% or more, such as 95% or more when determined based on the face or front of the gypsum board. The gypsum content may be 100% or less, such as 95% or less, such as 90% or less, such as 85% or less when determined based on the face or front of the gypsum board. The gypsum content may be 50% or more, such as 60% or more, such as 65% or more, such as 70% or more, such as 75% or more, such as 80% or more, such as 85% or more, such as 90% or more, such as 95% or more when determined based on the back of the gypsum board. The gypsum content may be 100% or less, such as 95% or less, such as 90% or less, such as 85% or less, such as 80% or less, such as 75% or less, such as 70% or less when determined based on the back of the gypsum board.

The gypsum board disclosed herein may have many applications. For instance, the gypsum board may be used as a standalone board in construction for the preparation of walls, ceilings, floors, etc. As used in the present disclosure, the term "gypsum board," generally refers to any panel, sheet, or planar structure, either uniform or formed by connected portions or pieces, that is constructed to at least partially establish one or more physical boundaries. Such existing, installed, or otherwise established or installed wall or ceiling structures comprise materials that may include, as non-limiting examples, gypsum, stone, ceramic, cement, wood, composite, or metal materials. The installed gypsum board forms part of a building structure, such as a wall or ceiling.

The thickness of the gypsum board, and in particular, the gypsum core, is not necessarily limited and may be from about 0.25 inches to about 1 inch. For instance, the thickness may be at least ¼ inches, such as at least 5/16 inches, such as at least ⅜ inches, such as at least ½ inches, such as at least ⅝ inches, such as at least ¾ inches, such as at least 1 inch. In this regard, the thickness may be about any one of the aforementioned values. For instance, the thickness may be about ¼ inches. Alternatively, the thickness may be about ⅜ inches. In another embodiment, the thickness may be about ½ inches. In a further embodiment, the thickness may be about ⅝ inches. In another further embodiment, thickness may be about 1 inch. In addition, at least two gypsum boards may be combined to create another gypsum board. For example, at least two gypsum boards having a thickness of about 5/16 inches each may be combined or sandwiched to create a gypsum board having a thickness of about ⅝ inches. While this is one example, it should be understood that any combination of gypsum boards may be utilized to prepare a sandwiched gypsum board. With regard to the thickness, the term "about" may be defined as within 10%, such as within 5%, such as within 4%, such as within 3%, such as within 2%, such as within 1%.

In addition, the board weight of the gypsum board is not necessarily limited. For instance, the gypsum board may have a board weight of 500 lbs/MSF or more, such as about 600 lbs/MSF or more, such as about 700 lbs/MSF or more, such as about 800 lbs/MSF or more, such as about 900 lbs/MSF or more, such as about 1000 lbs/MSF or more, such as about 1100 lbs/MSF or more, such as about 1200 lbs/MSF or more, such as about 1300 lbs/MSF or more, such as about 1400 lbs/MSF or more, such as about 1500 lbs/MSF or more. The board weight may be about 7000 lbs/MSF or less, such as about 6000 lbs/MSF or less, such as about 5000 lbs/MSF or less, such as about 4000 lbs/MSF or less, such as about 3000 lbs/MSF or less, such as about 2500 lbs/MSF or less, such as about 2000 lbs/MSF or less, such as about 1800 lbs/MSF or less, such as about 1600 lbs/MSF or less, such as about 1500 lbs/MSF or less, such as about 1400 lbs/MSF or less, such as about 1300 lbs/MSF or less, such as about 1200 lbs/MSF or less. Such board weight may be a dry board weight such as after the board leaves the heating or drying device (e.g., kiln).

In addition, the gypsum board may have a density of about 5 pcf or more, such as about 10 pcf or more, such as about 15 pcf or more, such as about 20 pcf or more. The board may have a density of about 60 pcf or less, such as about 50 pcf or less, such as about 40 pcf or less, such as about 35 pcf or less, such as about 33 pcf or less, such as about 30 pcf or less, such as about 28 pcf or less, such as about 25 pcf or less, such as about 23 pcf or less, such as about 20 pcf or less.

The gypsum board may have a certain nail pull resistance, which generally is a measure of the force required to pull a gypsum panel off a wall by forcing a fastening nail through the panel. The values obtained from the nail pull test generally indicate the maximum stress achieved while the fastener head penetrates through the board surface and core. In this regard, the gypsum board exhibits a nail pull resistance of at least about 25 $lb_f$, such as at least about 30 pounds, such as at least about 35 $lb_f$, such as at least about 40 $lb_f$, such as at least about 45 $lb_f$, such as at least about 50 $lb_f$, such as at least about 55 $lb_f$, such as at least about 60 $lb_f$, such as at least about 65 $lb_f$, such as at least about 70 $lb_f$, such as at least about 75 $lb_f$, such as at least about 77 $lb_f$, such as at least about 80 $lb_f$, such as at least about 85 $lb_f$, such as at least about 90 $lb_f$, such as at least about 95 $lb_f$, such as at least about 100 $lb_f$ as tested according to ASTM C1396. The nail pull resistance may be about 150 $lb_f$ or less, such as about 140 $lb_f$ or less, such as about 130 $lb_f$ or less, such as about 120 $lb_f$ or less, such as about 110 $lb_f$ or less, such as about 105 $lb_f$ or less, such as about 100 $lb_f$ or less, such as about 95 $lb_f$ or less, such as about 90 $lb_f$ or less, such as about 85 $lb_f$ or less, such as about 80 $lb_f$ or less as tested according to ASTM C1396. Such nail pull resistance may be based upon the thickness of the gypsum board. For instance, when conducting a test, such nail pull resistance values may vary depending on the thickness of the gypsum board. As an example, the nail pull resistance values above may be for a ⅝ inch board. However, it should be understood that instead of a ⅝ inch board, such nail pull resistance values may be for any other thickness gypsum board as mentioned herein.

The gypsum board may have a certain core compressive strength. For instance, the core compressive strength may be about 150 psi or more, such as about 200 psi or more, such as about 250 psi or more, such as about 300 psi or more, such as about 350 psi or more, such as about 375 psi or more, such as about 400 psi or more, such as about 500 psi or more as tested according to ASTM C473. The core compressive strength may be about 3000 psi or less, such as about 2500 psi or less, such as about 2000 psi or less, such as about 1700 psi or less, such as about 1500 psi or less, such as about 1300 psi or less, such as about 1100 psi or less, such as about 1000 psi or less, such as about 900 psi or less, such as about 800 psi or less, such as about 700 psi or less, such as about 600 psi or less, such as about 500 psi or less. Such core compressive strength may be based upon the density and thickness of the gypsum board. For instance, when conducting a test, such core compressive strength values may vary depending on the thickness of the gypsum board. As an example, the core compressive strength values above may be for a ⅝ inch board. However, it should be understood that instead of a ⅝ inch board, such core compressive strength values may be for any other thickness gypsum board as mentioned herein.

In addition, the gypsum board may have a core hardness of at least about 8 $lb_f$, such as at least about 10 $lb_f$, such as at least about 11 $lb_f$, such as at least about 12 $lb_f$, such as at least about 15 $lb_f$, such as at least about 18 $lb_f$, such as at least about 20 $lb_f$ as tested according to ASTM C1396. The gypsum board may have a core hardness of 50 $lb_f$ or less, such as about 40 $lb_f$ or less, such as about 35 $lb_f$ or less, such as about 30 $lb_f$ or less, such as about 25 $lb_f$ or less, such as about 20 $lb_f$ or less, such as about 18 $lb_f$ or less, such as about 15 $lb_f$ or less as tested according to ASTM C1396. In addition, the gypsum board may have an end hardness according to the aforementioned values. Such core hardness may be based upon the thickness of the gypsum board. For instance, when conducting a test, such core hardness values may vary depending on the thickness of the gypsum board. As an example, the core hardness values above may be for a ⅝ inch board. However, it should be understood that instead of a ⅝ inch board, such core hardness values may be for any other thickness gypsum board as mentioned herein.

In addition, the gypsum board may have an edge hardness of at least about 8 $lb_f$, such as at least about 10 $lb_f$, such as at least about 11 $lb_f$, such as at least about 12 $lb_f$, such as at least about 15 $lb_f$, such as at least about 18 $lb_f$, such as at least about 20 $lb_f$, such as at least about 24 $lb_f$, such as at least about 28 $lb_f$, such as at least about 30 $lb_f$, such as at least about 33 $lb_f$ as tested according to ASTM C1396 and ASTM C473. The gypsum board may have an edge hardness of about 50 $lb_f$ or less, such as about 40 $lb_f$ or less, such as about 35 $lb_f$ or less, such as about 30 $lb_f$ or less, such as about 25 $lb_f$ or less, such as about 20 $lb_f$ or less, such as about 18 $lb_f$ or less, such as about 15 $lb_f$ or less as tested according to ASTM C1396 and ASTM C473. Such edge hardness may be based upon the thickness of the gypsum board. For instance, when conducting a test, such edge hardness values may vary depending on the thickness of the gypsum board. As an example, the edge hardness values above may be for a ⅝ inch board. However, it should be understood that instead of a ⅝ inch board, such edge hardness values may be for any other thickness gypsum board as mentioned herein.

In addition, it may also be desired to have an effective bond between the facing material and the gypsum core. Typically, a humidified bond test is performed for 2 hours in a humidity chamber at 90° F. and 90% humidity. In this test, after exposure, the facing material is removed and the bond is assessed using one of the two following characterizations: percentage of facing material remaining on the core and/or percentage of gypsum present on the facing material once removed. The percent coverage (or surface area) can be determined using various optical analytical techniques. In this regard, the percentage coverage may be less than 100%, such as 99% or less, such as 98% or less, such as 95% or less, such as 93% or less, such as 90% or less, such as 80% or less, such as 70% or less, such as 60% or less, such as 50% or less, such as 40% or less, such as 30% or less, such as 25% or less, such as 20% or less, such as 15% or less, such as 10% or less, such as 9% or less, such as 8% or less, such as 5% or less, such as 3% or less, such as 2% or less. The percent coverage may be more than 0%, such as 2% or more, such 5% or more, such as 10% or more, such as 15% or more, such as 20% or more, such as 30% or more, such as 40% or more, such as 50% or more, such as 60% or more, such as 70% or more, such as 75% or more, such as 80% or more, such as 85% or more, such as 90% or more, such as 92% or more, such as 95% or more, such as 97% or more, such as 98% or more. Such percentage may be based on removal of the facing material on the face of the gypsum board. Alternatively, such percentage may be based on removal of the facing material on the back of the gypsum board. Further, such percentages may be based on removal of the facing material on both the face and back of the gypsum board. Furthermore, such percentage may be based on the In addition, such values may be for an average of at least 3 gypsum boards, such as at least 5 gypsum boards.

In general, upon removal of the facing material, depending on the "failure" of the facing material, some of the facing material may remain on the gypsum core and/or some of the gypsum may adhere to the facing material. With facing material remaining on the gypsum core and minimizing the amount of gypsum adhered to the facing material, this can indicate a relatively strong gypsum-facing material bond. For instance, this may indicate a general "failure" or weakening within the facing material rather than the gypsum core-facing material bond. In this regard, regarding the above-referenced humidified bond test, in one embodiment, such percentages may be based on the percent coverage of gypsum on the facing material. Generally, it may be desired to have a low percent coverage based on this approach. In another embodiment, such humidified bond test may be based on the percent coverage of the facing material remaining on the gypsum core upon removal. Generally, it may be desired to have a relatively high percent coverage based on this approach.

EXAMPLES

Test Methods

Gypsum content: The gypsum content was determined based on Rietveld Refinement using XRD with a copper-K-alpha source. The number of scans was >25. In general, the higher the percent of gypsum content, the lower the amount of the hemihydrate phase from dehydration of the gypsum in the final gypsum board due to drying/heating.

Edge hardness: The edge hardness of the gypsum board may be determined in accordance with ASTM C1396 and ASTM C473. In particular, the specimens shall be taken from opposite facing material-bound edges of a gypsum board with the 19" dimension parallel to the edges. In addition, the core may be exposed for testing along the edge of each specimen at three locations 4"-5" apart by carefully cutting just through the facing material and stripping away an area approximately ⅜"×thickness of gypsum board. The testing conditions include a constant specimen weight at 70° F. to 100° F. and 50+2% relative humidity. Regarding the load, it should be applied with a continuous flow of lead shot at the rate of 12±1.2 lbs./minute with a load ratio of 5 (20"/4") and the force applied will be 60±6 lbs./minute.

Example 1

Gypsum boards were made using glycerol in a first gypsum core section as illustrated in FIG. 1 wherein the glycerol is present in a dense layer. The gypsum boards were compared against a board that did not utilize glycerol. The gypsum boards had a board thickness of about ½. The gypsum content was measured below the back facing material and below the front facing material as well as in the center of the gypsum board. As indicated in the table below, the boards with glycerol exhibited overall lower calcination (hemihydrate content) which equates to higher percentage of gypsum content.

| | Center (2' from edge) | | | Opposite Hard Edge | | | Hard Edge | | |
|---|---|---|---|---|---|---|---|---|---|
| | | | | | ½" inch, | ½" inch, | | ½" inch, | ½" inch, |
| Sample | Face | Center | Back | Edge | face | back | Edge | face | back |
| Control 1 | 87.9 | 88.4 | 86.8 | 3.3 | 84.1 | 75.0 | 2.7 | 85.8 | 87.1 |
| | — | — | — | — | — | — | 7.7 | 76.4 | 81.6 |
| Sample 1 (0.4 lbs. glycerol/MSF) | 89.4 | 90.9 | 89.7 | 78.8 | 87.5 | 84.7 | 78.5 | 88.2 | 88.6 |
| | — | — | — | — | — | — | 73.3 | 86.6 | 86.1 |

Example 2

Gypsum boards were made using glycerol in a first gypsum core section as illustrated in FIG. 1 wherein the glycerol is present in a dense layer. The gypsum boards were compared against a board that did not utilize glycerol. The gypsum boards had a board thickness of about ⅝". The gypsum content was measured below the back facing material and below the front facing material as well as in the center of the gypsum board. For the boards, the percent of gypsum content was determined. As indicated in the table below, the boards with glycerol exhibited overall lower calcination (hemihydrate content) which equates to higher percentage of gypsum content and higher hardness.

| Sample | Thickness | Board Weight (lbs./MSF) | Edge Hardness (lb$_f$) 1$^{st}$ Edge | 2$^{nd}$ Edge |
|---|---|---|---|---|
| Control 1 | ½" | 1350 | 25 | 26 |
| Sample 1 (0.4 lbs. glycerol/MSF) | ½" | 1353 | 34 | 35 |
| Control 2 | ⅝" | 2813 | 19 | 25 |
| Sample 2 (0.5 lbs. glycerol/MSF) | ⅝" | 2837 | 23 | 25 |
| | ⅝" | 2870 | 21 | 28 |
| | ⅝" | 2861 | 25 | 35 |
| | ⅝" | 2871 | 24 | 36 |

| | | Center (2' from edge) | | | Opposite Hard Edge | | | Hard Edge | | |
|---|---|---|---|---|---|---|---|---|---|---|
| | | | | | | ½" inch, | ½" inch, | | ½" inch, | ½" inch, |
| Sample | | Face | Center | Back | Edge | face | back | Edge | face | back |
| Control 2 | 1 | 87.5 | 91.9 | 90.4 | 1.9 | 3.0 | 4.8 | 3.5 | 3.2 | 2.2 |
| | 2 | 91.3 | 92.6 | 90.4 | 2.4 | 7.0 | 3.0 | 4.5 | 46.8 | 59.8 |
| | 3 | — | — | — | — | — | — | 3.2 | 7.2 | 43.9 |
| | Avg. | 89.4 | 92.3 | 90.4 | 2.2 | 5.0 | 3.9 | 3.7 | 19.1 | 35.3 |
| Sample 2 (0.5 lbs. glycerol/MSF) | 1 | — | — | — | — | — | — | 3.9 | 70.2 | 70.8 |
| | 2 | 88.8 | 93.3 | 86.9 | 5.3 | 81.3 | 15.1 | 5.1 | 68.8 | 79.7 |
| | 3 | 90.1 | 92.8 | 90.4 | 3.1 | 32.1 | 7.9 | 7.1 | 79.1 | 74.3 |
| | 4 | 87.8 | 92.9 | 89.7 | 3.6 | 25.3 | 13.9 | 3.0 | 79.2 | 80.0 |
| | Avg. | 88.9 | 93.0 | 89.0 | 4.0 | 46.2 | 12.3 | 4.8 | 74.3 | 76.2 |
| Sample 3 (0.7 lbs. glycerol/MSF) | 1 | 88.2 | 92.0 | 90.1 | 5.6 | 19.4 | 7.2 | 4.8 | 84.1 | 76.1 |
| | 2 | — | — | — | — | — | — | 2.1 | 64.2 | 77.1 |
| | 3 | 86.8 | 93.8 | 90.9 | 2.7 | 14.2 | 7.8 | 4.3 | 82.7 | 84.1 |
| | Avg. | 87.5 | 92.9 | 90.5 | 4.2 | 16.8 | 7.5 | 3.7 | 77.0 | 79.1 |
| Sample 4 (0.9 lbs. glycerol/MSF) | 1 | 88.6 | 93.7 | 91.2 | 2.8 | 5.2 | 6.9 | 14.1 | 66.6 | 46.1 |
| | 2 | — | — | — | — | — | — | 4.0 | 48.6 | 68.4 |
| | 3 | 88.5 | 92.6 | 90.4 | 3.9 | 71.6 | 10.4 | 5.8 | 72.8 | 75.3 |
| | Avg. | 88.6 | 93.2 | 90.8 | 3.4 | 38.4 | 8.7 | 8.0 | 62.7 | 63.3 |
| Control 3 | 1 | 87.6 | 93.7 | 89.2 | 2.3 | 50.5 | 36.3 | 2.7 | 82.4 | 70.3 |

Example 3

Gypsum boards were made using glycerol in a first gypsum core section as illustrated in FIG. 1 wherein the glycerol is present in a dense layer. The gypsum boards were compared against a board that did not utilize glycerol. In particular, the edge hardness of the boards was compared along a first edge and a second and opposing edge. As indicated in the table below, the boards with glycerol exhibited overall higher edge hardness values thereby indicating a higher percentage of gypsum content.

-continued

| Sample | Thickness | Board Weight (lbs./MSF) | Edge Hardness (lb$_f$) 1$^{st}$ Edge | 2$^{nd}$ Edge |
|---|---|---|---|---|
| Sample 3 (0.7 lbs. glycerol/MSF) | ⅝" | 2835 | 24 | 30 |
| | ⅝" | 2826 | 22 | 24 |
| Sample 4 (0.9 lbs. glycerol/MSF) | ⅝" | 2841 | 30 | 33 |
| | ⅝" | 2841 | 31 | 42 |
| Control 3 | ⅝" | — | 27 | 22 |

The invention claimed is:

1. A gypsum board comprising:
   a gypsum core comprising a first gypsum core section and a second gypsum core section each comprising gypsum, wherein the first gypsum core section comprises a polyol compound and has a density higher than a density of the second gypsum core section; and
   a first facing material and a second facing material, wherein the first facing material and the second facing material sandwich the gypsum core.

2. The gypsum board of claim 1, wherein the polyol compound comprises a sugar, a sugar alcohol, a polyether, a polysaccharide, or a mixture thereof.

3. The gypsum board of claim 1, wherein the polyol compound comprises a sugar alcohol.

4. The gypsum board of claim 3, wherein the sugar alcohol comprises maltitol, sorbitol, mannitol, xylitol, erythritol, isomalt, threitol, arabitol, galactitol, fucitol, iditol, inositol, volemitol, lactitol, or a mixture thereof.

5. The gypsum board of claim 3, wherein the sugar alcohol comprises glycerol.

6. The gypsum board of claim 1, wherein the polyol compound comprises a sugar.

7. The gypsum board of claim 6, wherein the sugar comprises glucose, sucrose, fructose, lactose, or a mixture thereof.

8. The gypsum board of claim 1, wherein the polyol compound comprises a polyether.

9. The gypsum board of claim 8, wherein the polyether comprises polyethylene glycol, polypropylene glycol, or a mixture thereof.

10. The gypsum board of claim 1, wherein the polyol compound comprises a polysaccharide.

11. The gypsum board of claim 1, wherein the polyol compound has a molecular weight of from 25 g/mol to 5,000 g/mol.

12. The gypsum board of claim 1, wherein the polyol compound is present in an amount of from 0.001 lbs/MSF to 10 lbs/MSF based on the weight of the gypsum board.

13. The gypsum board of claim 1, wherein the second gypsum core section does not include a polyol compound.

14. The gypsum board of claim 1, wherein the gypsum board exhibits a gypsum content of 75% or more when determined based on the front of the gypsum board.

15. The gypsum board of claim 1, wherein the gypsum board exhibits a gypsum content of 65% or more when determined based on the back of the gypsum board.

16. The gypsum board of claim 1, wherein the gypsum board exhibits an edge hardness of 15 $lb_f$ to 50 $lb_f$ when measured according to ASTM C1396 and ASTM C473.

17. The gypsum board of claim 1, wherein the gypsum board exhibits a nail pull resistance of 70 $lb_f$ or more when measured according to ASTM C1396, a core compressive strength of 300 psi or more when measured according to ASTM C1396, or both.

18. The gypsum board of claim 1, wherein the second gypsum core section has a density that is 0.1% or more to 80% or less the density of the first gypsum core section.

19. The gypsum board of claim 1, wherein the gypsum core comprises a third gypsum core section comprising gypsum and the polyol compound.

20. The gypsum board of claim 1, wherein the gypsum core comprises a third gypsum core section and a fourth gypsum core section comprising gypsum and the polyol compound.

21. The gypsum board of claim 1, wherein the gypsum core comprises a third gypsum core section, a fourth gypsum core section, and a fifth gypsum ore section comprising gypsum and the polyol compound.

22. A method for making the gypsum board of claim 1, the method comprising:
   providing a first facing material;
   depositing a first gypsum slurry comprising stucco, a polyol compound, and water onto the first facing material;
   depositing a second gypsum slurry comprising stucco and water onto the first gypsum slurry;
   providing a second facing material on the second gypsum slurry; and
   allowing the stucco to convert to calcium sulfate dihydrate.

23. A method for making the gypsum board of claim 1, the method comprising
   providing a first facing material;
   depositing onto a first facing material
      a first gypsum slurry comprising stucco, a polyol compound, and water,
      a second gypsum slurry comprising stucco and water, and
      a third gypsum slurry comprising stucco, a polyol compound, and water,
      wherein the second gypsum slurry is deposited between the first gypsum slurry and the second gypsum slurry;
   providing a second facing material on the first, second, and third gypsum slurries; and
   allowing the stucco to convert to calcium sulfate dihydrate.

24. A method for making the gypsum board of claim 1, the method comprising:
   providing a first facing material;
   depositing a first gypsum slurry comprising stucco, a polyol compound, and water onto the first facing material;
   depositing onto the first gypsum slurry
      a second gypsum slurry comprising stucco, a polyol compound, and water,
      a third gypsum slurry comprising stucco and water, and
      a fourth gypsum slurry comprising stucco, a polyol compound, and water,
      wherein the third gypsum slurry is deposited between the second gypsum slurry and the third gypsum slurry;
   providing a second facing material on the second, third, and fourth gypsum slurries; and
   allowing the stucco to convert to calcium sulfate dihydrate.

* * * * *